(12) United States Patent
Sohn

(10) Patent No.: US 11,341,742 B2
(45) Date of Patent: May 24, 2022

(54) APPARATUS AND METHOD OF ESTIMATING SELF-LOCATION OF VEHICLE

(71) Applicant: ELECTRONICS AND TELECOMMUNICATIONS RESEARCH INSTITUTE, Daejeon (KR)

(72) Inventor: Joo Chan Sohn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 335 days.

(21) Appl. No.: 16/696,461

(22) Filed: Nov. 26, 2019

(65) Prior Publication Data

US 2020/0202104 A1     Jun. 25, 2020

(30) Foreign Application Priority Data

Dec. 24, 2018   (KR) .......................... 10-2018-0168628

(51) Int. Cl.
*G06K 9/00* (2022.01)
*G06V 20/13* (2022.01)
(Continued)

(52) U.S. Cl.
CPC .............. *G06V 20/13* (2022.01); *G01S 5/021* (2013.01); *G01S 5/0284* (2013.01); *G06V 10/255* (2022.01); *G06V 20/56* (2022.01)

(58) Field of Classification Search
CPC .............. G06K 9/0063; G06K 9/00791; G06K 9/3241; G01S 5/021; G01S 5/0284;
(Continued)

(56) References Cited

U.S. PATENT DOCUMENTS 7,873,240 B2 *   1/2011   Oldroyd ................. G01C 11/00
                                                    382/294
9,036,000 B1 *   5/2015   Ogale .................... G06T 3/4038
                                                    348/36
(Continued)

FOREIGN PATENT DOCUMENTS

CA        2680628 A1 *   9/2008   ............. G01C 15/00
CN      100410478 C  *   8/2008   ............. B66C 13/40
(Continued)

*Primary Examiner* — Mahendra R Patel

(57) ABSTRACT

A method of estimating a self-location of a vehicle includes obtaining an omnidirectional image by using an omnidirectional camera photographing a ground around a driving vehicle at a current location of the driving vehicle, estimating the current location of the driving vehicle on the basis of a global positioning system (GPS) satellite signal received from a satellite, searching a satellite image database storing a satellite image obtained by photographing the ground with the satellite to determine candidate satellite images corresponding to the estimated current location of the driving vehicle, comparing the omnidirectional image with each of the determined candidate satellite images to determine a candidate satellite image having a highest similarity to the omnidirectional image from among the determined candidate satellite images, and finally estimating the current location of the driving vehicle by using a location measurement value mapped to the determined candidate satellite image.

17 Claims, 9 Drawing Sheets

(51) Int. Cl.
  *G01S 5/02* (2010.01)
  *G06V 10/20* (2022.01)
  *G06V 20/56* (2022.01)
(58) Field of Classification Search
  CPC .... G01S 19/485; G01C 21/30; B60W 60/001; B60W 2050/0057; B60W 40/02; B60W 30/14; B60W 40/10; B60W 2420/42; B60W 2556/50; B60W 2556/60; G06T 7/30; G06T 7/74; H04N 5/217; H04N 5/247; H04N 7/181
  USPC ........................................................ 382/100
  See application file for complete search history.

(56) References Cited

U.S. PATENT DOCUMENTS

| | | | | |
|---|---|---|---|---|
| 9,218,529 | B2 * | 12/2015 | Lewis | G06K 9/0063 |
| 9,383,207 | B2 * | 7/2016 | Padowicz | G01C 21/04 |
| 10,515,458 | B1 * | 12/2019 | Yakimenko | G06T 7/66 |
| 2006/0132602 | A1 * | 6/2006 | Muto | H04N 7/18 348/148 |
| 2010/0013921 | A1 * | 1/2010 | Joko | H04N 7/181 348/143 |
| 2010/0066825 | A1 * | 3/2010 | Kuboyama | G06K 9/00812 348/118 |
| 2010/0103040 | A1 * | 4/2010 | Broadbent | G01S 19/48 342/357.28 |
| 2010/0329542 | A1 * | 12/2010 | Ramalingam | G06T 7/80 348/118 |
| 2012/0007982 | A1 * | 1/2012 | Giuffrida | H04N 7/181 348/148 |
| 2013/0197799 | A1 * | 8/2013 | Cho | G01C 21/3407 701/430 |
| 2013/0243250 | A1 * | 9/2013 | France | G06V 10/40 382/103 |
| 2013/0287290 | A1 * | 10/2013 | Owechko | G06T 7/344 382/154 |
| 2013/0304374 | A1 * | 11/2013 | Lee | G06V 20/54 701/445 |
| 2013/0311079 | A1 * | 11/2013 | Rakshit | G01C 21/3623 701/400 |
| 2014/0343842 | A1 * | 11/2014 | Ranganathan | G01C 21/30 701/472 |
| 2015/0227775 | A1 * | 8/2015 | Lewis | G06V 20/647 345/419 |
| 2016/0011297 | A1 * | 1/2016 | Cho | G01S 5/06 342/394 |
| 2017/0169300 | A1 * | 6/2017 | Heisele | G06K 9/00208 |
| 2017/0192436 | A1 * | 7/2017 | Min | G01C 21/34 |
| 2018/0025632 | A1 * | 1/2018 | Breed | G01C 21/32 701/93 |
| 2018/0149744 | A1 * | 5/2018 | Bialer | G01S 13/06 |
| 2018/0359445 | A1 * | 12/2018 | Liao | A61B 5/0022 |
| 2020/0005486 | A1 * | 1/2020 | Sinha | G06T 7/74 |
| 2020/0086793 | A1 * | 3/2020 | Watanabe | B62D 15/0285 |
| 2020/0202104 | A1 * | 6/2020 | Sohn | G01C 21/30 |
| 2020/0257301 | A1 * | 8/2020 | Weiser | G06N 3/02 |
| 2020/0265588 | A1 * | 8/2020 | Saito | G06T 7/246 |
| 2020/0271473 | A1 * | 8/2020 | Wang | G08G 1/167 |
| 2020/0336495 | A1 * | 10/2020 | Tada | H04L 63/145 |

FOREIGN PATENT DOCUMENTS

| | | | | |
|---|---|---|---|---|
| JP | 4807691 B2 * | 11/2011 | | G06T 15/00 |
| JP | 4860847 B2 * | 1/2012 | | G01C 21/3407 |
| KR | 101209062 B1 | 12/2012 | | |
| KR | 20180130671 A * | 12/2018 | | |
| WO | WO-2009098154 A1 * | 8/2009 | | G01S 19/49 |
| WO | WO-2010060720 A2 * | 6/2010 | | B60L 11/1816 |

* cited by examiner

FIG. 4

|  | $Y_1$ | $Y_2$ | $Y_3$ | $Y_4$ | $Y_5$ | $Y_6$ | $Y_7$ | ... | $Y_n$ |
|---|---|---|---|---|---|---|---|---|---|
| $X_1$ | $P_{11}$ | $P_{12}$ | $P_{13}$ | $P_{14}$ | $P_{15}$ | $P_{16}$ | $P_{17}$ | ... | $P_{1n}$ |
| $X_2$ | $P_{21}$ | $P_{22}$ | $P_{23}$ | $P_{24}$ | $P_{25}$ | $P_{26}$ | $P_{27}$ | ... | $P_{2n}$ |
| $X_3$ | $P_{31}$ | $P_{32}$ | $P_{33}$ | $P_{34}$ | $P_{35}$ | $P_{36}$ | $P_{37}$ | ... | $P_{3n}$ |
| $X_4$ | $P_{41}$ | $P_{42}$ | $P_{43}$ | $P_{44}$ | $P_{45}$ | $P_{46}$ | $P_{47}$ | ... | $P_{4n}$ |
| $X_5$ | $P_{51}$ | $P_{52}$ | $P_{53}$ | $P_{54}$ | $P_{55}$ | $P_{56}$ | $P_{57}$ | ... | $P_{5n}$ |
| $X_6$ | $P_{61}$ | $P_{62}$ | $P_{63}$ | $P_{64}$ | $P_{65}$ | $P_{66}$ | $P_{67}$ | ... | $P_{6n}$ |
| $X_7$ | $P_{71}$ | $P_{72}$ | $P_{73}$ | $P_{74}$ | $P_{75}$ | $P_{76}$ | $P_{77}$ | ... | $P_{7n}$ |
| ... | ... | ... | ... | ... | ... | ... | ... | ... | ... |
| $X_m$ | $P_{m1}$ | $P_{m2}$ | $P_{m3}$ | $P_{m4}$ | $P_{m5}$ | $P_{m6}$ | $P_{m7}$ | ... | $P_{mn}$ |

APPARATUS AND METHOD OF ESTIMATING SELF-LOCATION OF VEHICLE

CROSS-REFERENCE TO RELATED APPLICATIONS

This application claims priority under 35 U.S.C. § 119 to Korean Patent Application No. 10-2018-0168628, filed on Dec. 24, 2018, the disclosure of which is incorporated herein by reference in its entirety.

TECHNICAL FIELD

The present invention relates to technology for estimating a self-location of a vehicle.

BACKGROUND

Self-driving vehicles should accurately estimate a calculated driving path. In order to accurate estimate a driving path, self-driving vehicles should accurately calculate a self-location and a heading angle so as to be equal or similar to a real location and a real heading angle.

In order to precisely calculate a location and a heading angle, self-driving vehicles need to be equipped with sensor devices, such as a differential global positioning system (DGPS), a multichannel laser scanner, and a vision camera, and a storage device which stores high-definition (HD) map data including three-dimensional (3D) information (hereinafter referred to as point cloud data) such as road shape data, road surface indication data, traffic facilities shape data, and peripheral building shape data.

A self-driving vehicle equipped with the sensor devices and the HD map data may compare real-time point cloud data obtained from the sensor devices with point cloud data included in the HD map data to precisely calculate a current location and a heading angle thereof from a shape difference.

However, sensor devices such as DGPSs, multichannel laser scanners, and vision cameras are very expensive, and in a process of downloading HD map data from a long-distance server storing HD map data so as to periodically update HD map data having a tens-megabyte capacity, the high communication cost is expended and a transmission delay occurs. In addition, in order to process data obtained high-cost sensor devices in real time, a high-spec computer system should be equipped in self-driving vehicles.

SUMMARY

Accordingly, the present invention provides an apparatus and method for estimating a self-location and a heading angle of a self-driving vehicle by using a vehicle-periphery image and a satellite image respectively obtained from an omnidirectional camera and a satellite navigation device each installed in the self-driving vehicle.

In one general aspect, a method of estimating a self-location of a vehicle includes: obtaining an omnidirectional image by using an omnidirectional camera photographing a ground around a driving vehicle at a current location of the driving vehicle; estimating the current location of the driving vehicle on the basis of a global positioning system (GPS) satellite signal received from a satellite; searching a satellite image database storing a satellite image obtained by photographing the ground with the satellite to determine candidate satellite images corresponding to the estimated current location of the driving vehicle; comparing the omnidirectional image with each of the determined candidate satellite images to determine a candidate satellite image having a highest similarity to the omnidirectional image from among the determined candidate satellite images; and finally estimating the current location of the driving vehicle by using a location measurement value mapped to the determined candidate satellite image.

In another general aspect, an apparatus for estimating a self-location of a vehicle includes: an image matching unit configured to match a plurality of peripheral images obtained from an omnidirectional camera installed in a driving vehicle to generate an omnidirectional image; a candidate satellite image selector configured to search a satellite image database storing a satellite image to determine candidate satellite images corresponding to a current location of the driving vehicle estimated based on a global positioning system (GPS) satellite signal; an image comparator configured to compare the omnidirectional image with each of the determined candidate satellite images to determine a candidate satellite image having a highest similarity to the omnidirectional image; and a location determiner configured to estimate the current location of the driving vehicle by using a location measurement value mapped to the determined candidate satellite image.

Other features and aspects will be apparent from the following detailed description, the drawings, and the claims.

BRIEF DESCRIPTION OF THE DRAWINGS

FIG. 4 is a diagram for describing a method of selecting a candidate satellite image according to an embodiment of the present invention.

DETAILED DESCRIPTION OF EMBODIMENTS

Figure 1:
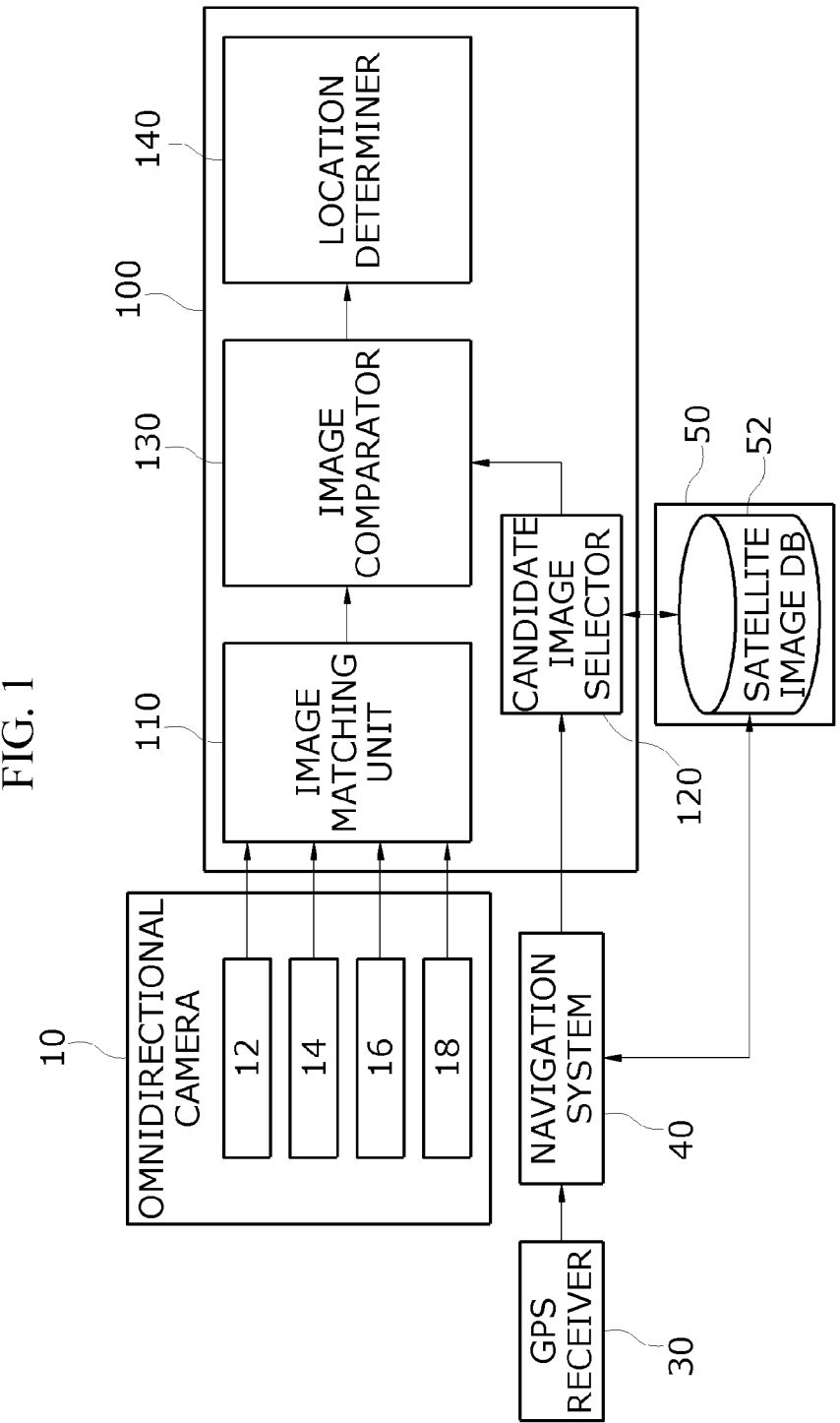
FIG. 1 is a whole system including an apparatus for estimating a self-location of a vehicle according to an embodiment of the present invention.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of 'comprise', 'include', or 'have' specifies a property, a region, a fixed number, a step, a process, an element and/or a component but does not exclude other properties, regions, fixed numbers, steps, processes, elements and/or components.

Hereinafter, an electronic device according to various embodiments will be described in detail with reference to the accompanying drawings.

FIG. 1 is a whole system including an apparatus for estimating a self-location of a vehicle according to an embodiment of the present invention.

Referring to FIG. 1, the whole system according to an embodiment of the present invention may include a self-location estimating apparatus 100 and may further include an omnidirectional camera 10, a global positioning system (GPS) receiver 30, a navigation system 40, and a storage device 50.

The omnidirectional camera 10 may be equipped in a vehicle (hereinafter referred to as a driving vehicle). The driving vehicle may be a self-driving vehicle, but is not limited thereto. The omnidirectional camera 10 may photograph a periphery of the vehicle to generate a plurality of peripheral images and may provide the peripheral images to the self-location estimating apparatus 100. The omnidirectional camera 10 may be an around view camera, but is not limited thereto. The omnidirectional camera 10 may include a plurality of cameras, for generating the plurality of peripheral images. For example, the omnidirectional camera 10 may include a front camera 12 which photographs a forward ground of the vehicle to generate a forward region image, a rear camera 14 which photographs a rearward ground of the vehicle to generate a rearward region image, a left camera 16 which photographs a left ground of the vehicle to generate a left region image, and a right camera 18 which photographs a right ground of the vehicle to generate a right region image.

The GPS receiver 30 may receive a GPS satellite signal from each of a plurality of satellites.

The navigation system 40 may estimate a current location of the driving vehicle by using the GPS satellite signal received through the GSP receiver 30. For example, the GPS system 40 may calculate a current location of the driving vehicle by using three GPS satellite signals received from three or more satellites according to trigonometric function law. The calculated current location may include a latitude value, a longitude value, and an altitude value. The navigation system 40 may provide the self-location estimating apparatus 100 with the current location of the driving vehicle on the basis of the GPS satellite signal.

The storage device 50 may store a satellite image database (DB) 52. The satellite image DB 52 may store satellite images previously obtained by photographing the ground from satellites. Each of the satellite images will be described below and may be divided into a plurality of regions so that each satellite image is compared with one omnidirectional image generated by processing a plurality of peripheral images obtained from a plurality of cameras 12, 14, 16, and 18 included in the omnidirectional camera 10. A location measurement value (for example, a latitude value, a longitude value, and an altitude value) mapped to each of divided regions may be further stored in the storage device 50. The storage device 50 may be a non-volatile storage medium.

The self-location estimating apparatus 100 may compare the omnidirectional image, generated by processing the plurality of peripheral images obtained from the omnidirectional camera 10, with the satellite images obtained from the satellite image DB 52 to determine a satellite image having a highest similarity to the omnidirectional image and may estimate a location measurement, mapped to the determined satellite image, as the current location of the vehicle.

To this end, the self-location estimating apparatus 100 may include an image matching unit 110, a candidate image selector 120, an image comparator 130, and a location determiner 140.

Image Matching Unit 110

The image matching unit 110 may match a plurality of peripheral images input from the omnidirectional camera 10 to generate an omnidirectional image compared with a plurality of candidate satellite images selected by the candidate satellite image selector 130. The image matching unit 110 may be implemented as a central processing unit (CPU), a graphics processing unit (GPU), or a combination thereof, which processes the plurality of peripheral images.

A process performed by the image matching unit 110 will be described below in detail with reference to FIG. 2.

Figure 2:
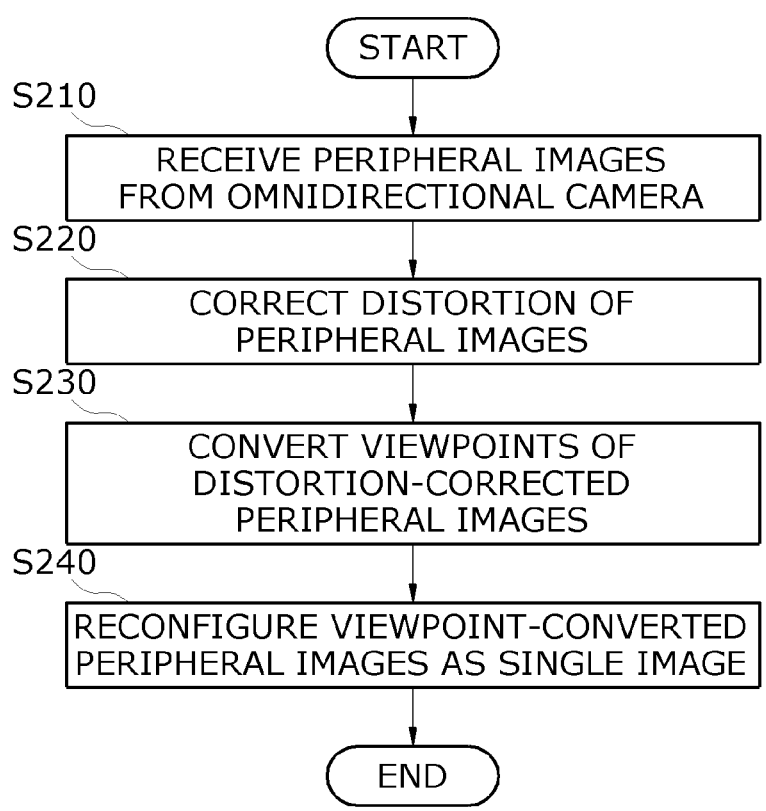
FIG. 2 is a flowchart illustrating a process performed by an image matching unit illustrated in FIG. 1.

Referring to FIG. 2, in step S210, the image matching unit 110 may receive a plurality of peripheral images obtained from the plurality of cameras 12, 14, 16, and 18 included in the omnidirectional camera 10.

Subsequently, in step S220, the image matching unit 110 may correct distortion of the plurality of peripheral images caused by characteristics of lenses included in each of the plurality of cameras 12, 14, 16, and 18. When each of the plurality of cameras 12, 14, 16, and 18 is an around view camera, each of the plurality of cameras 12, 14, 16, and 18 may include an optical angle lens, for securing a wide viewing angle. Due to characteristics of the optical angle lenses, image distortion may occur in the plurality of peripheral images. In order to correct the image distortion, the image matching unit 110 may calculate a parallel movement conversion matrix and a rotation conversion matrix each including camera intrinsic parameters and may convert the peripheral images on the basis of the parallel movement conversion matrix and the rotation conversion matrix, thereby correcting the image distortion. Here, the camera intrinsic parameters may include a focal length, an aspect ratio, and a principal point.

Subsequently, in step S230, the image matching unit 110 may convert viewpoints of a plurality of distortion-corrected peripheral images into viewpoints of satellite images. The cameras 12, 14, 16, and 18 may be installed to be parallel or inclined without being vertical with reference to the ground. That is, viewpoints of the peripheral images obtained by the cameras 12, 14, 16, and 18 may not be vertical to the ground. On the other hand, the satellite images obtained through photographing by a camera equipped in a satellite may have viewpoints vertical to the ground, and thus, viewpoints of the satellite images may differ from those of the peripheral images. Therefore, in order to precisely compare the satellite images with an omnidirectional image generated by processing the peripheral images, the viewpoints of the peripheral images should be converted into the viewpoints of the satellite images. The image matching unit 110 may calculate a parallel movement conversion matrix and a rotation conversion matrix each including camera extrinsic parameters and may rotate and parallel-move the peripheral images on the basis of the parallel movement conversion matrix and the rotation conversion matrix, thereby converting a viewpoint of each image.

Subsequently, in step S240, the image matching unit 110 may remove an overlap region between a plurality of viewpoint-converted peripheral images and may match peripheral images from which the overlap region is removed, thereby reconfiguring the viewpoint-converted peripheral images as a single image. A reconfigured single image may be output to the image comparator 140. The reconfigured single image may have a viewpoint vertical to the ground through viewpoint conversion which is performed in step S230 and may be referred to as an omnidirectional image.

Candidate Satellite Image Selector 120

Figure 3:
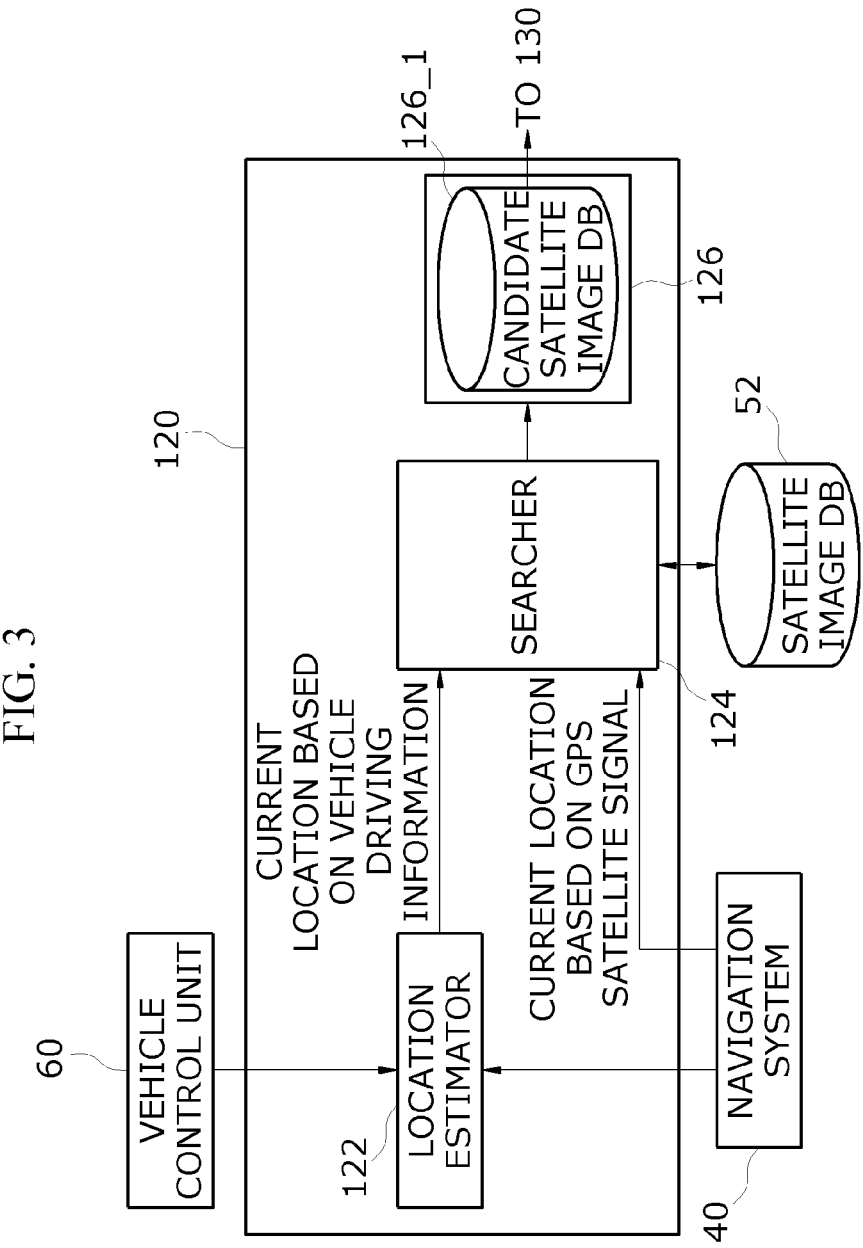
FIG. 3 is a block diagram illustrating an internal configuration of a candidate satellite image selector illustrated in FIG. 1.

FIG. 3 is a block diagram illustrating an internal configuration of the candidate satellite image selector 120 illustrated in FIG. 1.

Referring to FIG. 3, the candidate satellite image selector 120 may select candidate satellite images, which are to be compared with an omnidirectional image reconfigured (or matched) as the single image by the image matching unit 110, from among satellite images stored in the satellite image DB 52.

To this end, the candidate satellite image selector 120 may include a location estimator 122, a searcher 124, and a memory 126.

The location estimator 122 may estimate a current location of the driving vehicle by using vehicle driving information. In this case, the vehicle driving information may include a movement distance value, a movement direction value, a movement speed value, and a series of coordinate values representing a movement path until the driving vehicle reaches from a previous location to the current location.

The movement distance value and the movement direction value may be provided from a vehicle control unit 60. In order to receive the movement distance value and the movement direction value, the location estimator 122 may be connected to the vehicle control unit 60 through a vehicle network communication line. The vehicle network communication line may be a controller area network (CAN) communication line or a local interconnect network (LIN) communication line.

The vehicle control unit 60 may include a steering sensor for sensing a movement direction value of the driving vehicle, a brake pedal sensor for sensing a pressure value applied to a brake pedal, and an engine control unit (ECU) for providing a movement distance value and a movement speed value of the driving vehicle.

The location estimator 122 may estimate a current location of the driving vehicle by using vehicle driving information including the movement distance value, the movement speed value, and the movement direction value of the driving vehicle, the pressure value applied to the brake pedal, and the coordinate values representing the movement path, which are transferred from the vehicle control unit 60.

The searcher 124 may use, as a keyword, a current location of the driving vehicle estimated based on the vehicle driving information input from the location estimator 120 and a current location of the driving vehicle estimated based on a GPS satellite signal input from a navigation system 40. That is, the searcher 124 may search the satellite image DB 52 to search for and extract a satellite image corresponding to the current location of the driving vehicle estimated based on the vehicle driving information and a satellite image corresponding to the current location of the driving vehicle estimated based on the GPS satellite signal, determine the extracted satellite images as candidate images, and may store the determined candidate images in a candidate satellite image DB 126_1 of the memory 126.

The GPS satellite signal may have an error caused by refraction, signal delay, and reflection in a process of reaching the ground, based on topography, time, and weather. Therefore, the current location of the driving vehicle estimated based on the GPS satellite signal may have an error value.

When the error value increases, a difference between the current location of the driving vehicle estimated based on the GPS satellite signal and a real location may increase, and thus, it may not be preferable that only the satellite image corresponding to the current location of the driving vehicle estimated based on the GPS satellite signal is determined as a candidate satellite image compared with an omnidirectional image.

Hereinafter, a method of selecting a candidate satellite image will be described in detail with reference to FIG. 4.

First, it may be assumed that $P_{satellite}$ denotes a current location of a driving vehicle calculated based on a GPS satellite signal, $P_{real}$ denotes a real location of the driving vehicle, $P_{move}$ denotes a current location of the driving vehicle calculated based on vehicle driving information, and $P_{xy}$ denotes locations representing a path through which the driving vehicle has moved immediately until reaching a current location. In FIG. 4, $P_{xy}$ may be ($P_{41}$, $P_{42}$, $P_{43}$, $P_{44}$, $P_{54}$, $P_{64}$).

As described above, the current location $P_{satellite}$ of the driving vehicle calculated based on the GPS satellite signal may have a location measurement error caused by an environment factor, and thus, in order to increase the reliability of a search result, a satellite image corresponding to the current location of the driving vehicle calculated based on the vehicle driving information may be set to be within a search range for determining a satellite image as a candidate satellite image.

In FIG. 4, a current location $P_{move}$ of the driving vehicle which has moved from a location ($P_{64}$) just prior to the current location of the driving vehicle may be estimated based on a movement distance value, a movement direction value, and a series of coordinate values ($P_{41}$, $P_{42}$, $P_{43}$, $P_{44}$, $P_{54}$, $P_{64}$) representing a movement path until the driving vehicle reaches from the current location of the current location.

A movement direction (a horizontal direction and a vertical direction) and a movement distance of the driving vehicle may each have an error due to various physical environment factors such as a tire state of the driving vehicle and the complexity and road surface state of a road network through which the driving vehicle has moved.

For example, in FIG. 4, it may be assumed that the driving vehicle has moved from the location $P_{64}$ immediately before reaching a current location, and a real location $P_{real}$ has moved to $P_{66}$. Also, it may be assumed that a current location $P_{satellite}$ of the driving vehicle estimated based on the GPS satellite signal is calculated as 401a ($P_{37}$), and a current location $P_{move}$ of the driving vehicle calculated based on vehicle driving information (for example, a movement direction, a movement distance, and a movement speed) provided from the vehicle control unit 60 is estimated as regions ($P_{55}$, $P_{56}$, $P_{57}$, $P_{65}$, $P_{66}$, $P_{67}$, $P_{75}$, $P_{76}$, $P_{77}$) referred to by a reference numeral "402b".

In such assumptions, as illustrated in FIG. 4, a current location 401a of the driving vehicle estimated based on the GPS satellite signal may greatly differ from a current location 402b of the driving vehicle estimated based on the vehicle driving information.

In this case, in an embodiment of the present invention, a satellite location measurement error value $P_{satellite.error}$ of the current location $P_{satellite}$ of the driving vehicle estimated based on the GPS satellite signal may be calculated based on a satellite location measurement error function "f(environment parameter)" which uses an environment parameter of a district, where the driving vehicle is driving, as an input.

Subsequently, the self-location estimating apparatus may compare the calculated satellite location measurement error value $P_{satellite.error}$ with an error limit value $P_{satellite.limit}$ and may determine whether to add the current location $P_{satellite}$ of the driving vehicle to a search range for selecting a candidate satellite image, based on a result of the comparison.

The environment parameter may include a satellite location measurement error $V_{location}$ statistically calculated based on a district, a satellite location measurement error $V_{weather}$ statistically calculated based on weather, and a satellite location measurement error $V_{time}$ statistically calculated based on a location measurement time. The may be expressed as the following Equation (1).

$$P_{satellite.error} = f(V_{location}, V_{weather}, V_{time}) \quad [\text{Equation 1}]$$

$P_{satellite.limit}$: estimation error limit value of a satellite location measurement result The satellite location measurement error function $f(V_{location}, V_{weather}, V_{time})$ for calculating the satellite location measurement error value $P_{satellite.error}$ should be calculated through a process of comparing a satellite location measurement error with an error between a location measurement result based on the GPS satellite signal and a real location on the basis of various environment parameters relevant thereto, and thus, a detailed equation of the satellite location measurement error function $f(V_{location}, V_{weather}, V_{time})$ is omitted herein.

In an embodiment of the present invention, when the satellite location measurement error value $P_{satellite.error}$ is greater than the error limit value $P_{satellite.limit}$, it may be determined that 401a ($P_{37}$) indicating the current location $P_{satellite}$ of the driving vehicle estimated based on the GPS satellite signal is low in reliability of location measurement accuracy, and thus, a satellite image corresponding to 401a ($P_{37}$) may be excluded from candidate satellite images and satellite images corresponding to the regions ($P_{55}$, $P_{56}$, $P_{57}$, $P_{65}$, $P_{66}$, $P_{67}$, $P_{75}$, $P_{76}$, $P_{77}$) included in 402b representing the current location $P_{move}$ of the driving vehicle calculated based on vehicle driving information may be set to a search range for selecting the candidate satellite images.

When $P_{satellite}$ is 401b ($P_{46}$) and $P_{satellite.error}$ is less than $P_{satellite.limit}$ and is adjacent to 402b representing the current location $P_{move}$ of the driving vehicle calculated based on vehicle driving information as illustrated in FIG. 4, the search range may extend to {$P_{45}$, $P_{46}$, $P_{47}$, $P_{55}$, $P_{56}$, $P_{57}$, $P_{65}$, $P_{66}$, $P_{67}$, $P_{75}$, $P_{76}$, $P_{77}$}. That is, the search range may be set to include regions ($P_{45}$, $P_{47}$) adjacent to 401b ($P_{46}$) and 402b. On the other hand, when a magnitude of the search range is fixed, namely, when a magnitude of the search range is fixed to include nine regions as illustrated in FIG. 4, the search range may move to include 401b ($P_{46}$). In this case, the search range may be {$P_{45}$, $P_{46}$, $P_{47}$, $P_{55}$, $P_{56}$, $P_{57}$, $P_{65}$, $P_{66}$, $P_{67}$}.

FIG. 4 illustrates an example which helps understand the present invention. A search range for satellite images may be variously adjusted based on a movement speed of a driving vehicle and a shape of a road network included in map data of the navigation system 40, and the magnitude and shape of the search range may be variously adjusted based on an operating environment of the driving vehicle.

Figure 5:
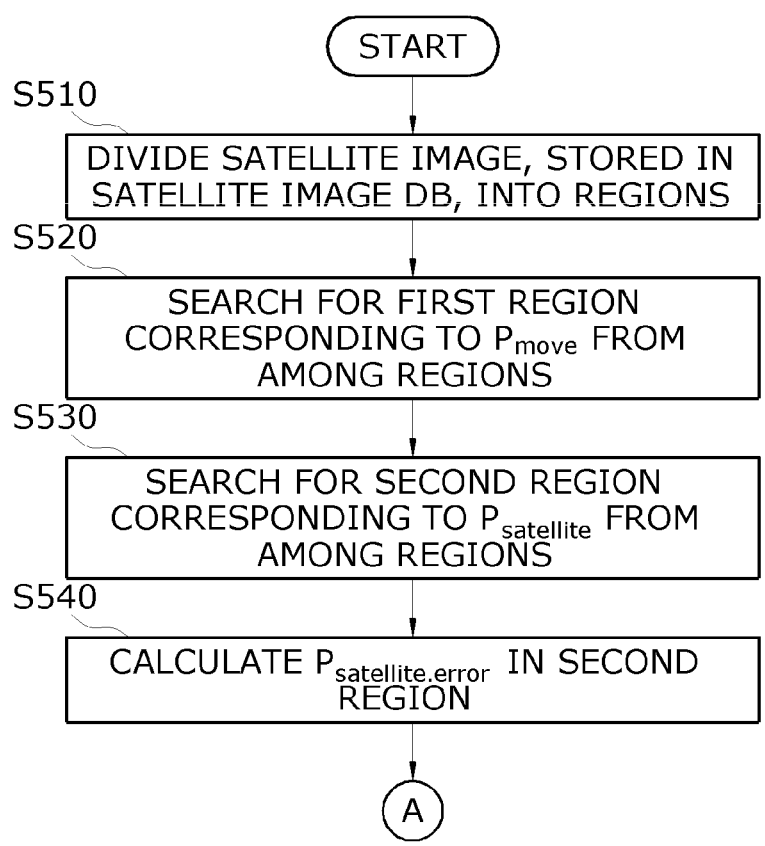
FIGS. 5 and 6 are flowcharts illustrating a method of selecting a candidate satellite image according to an embodiment of the present invention.
Figure 6:
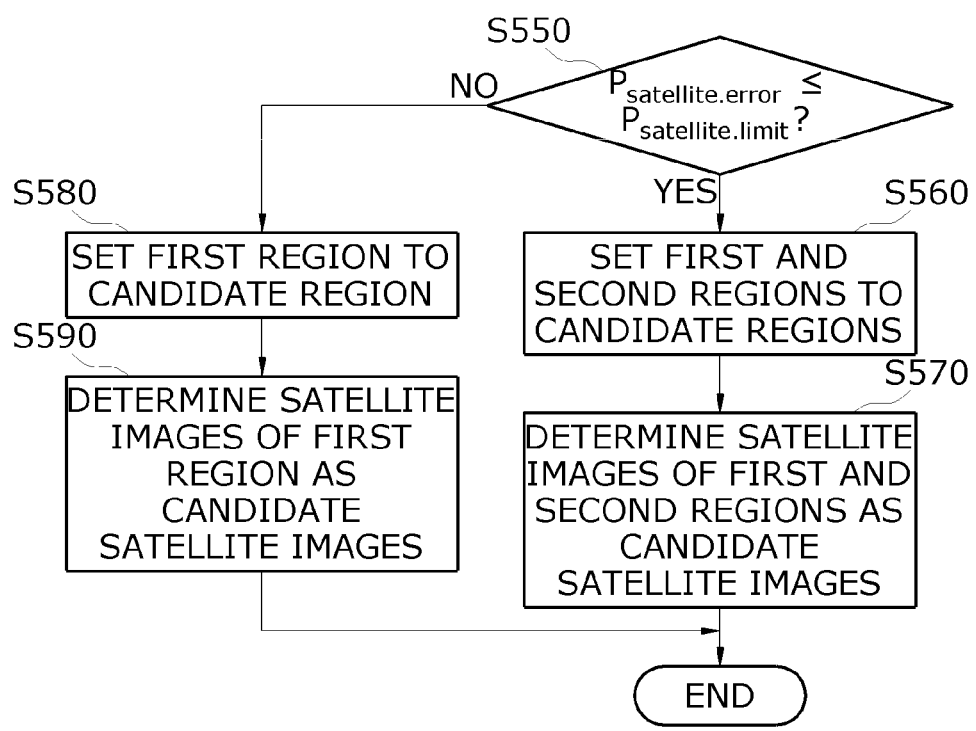

FIGS. 5 and 6 are flowcharts illustrating a method of selecting a candidate satellite image according to an embodiment of the present invention.

Referring to FIGS. 5 and 6, in step S510, a satellite image stored in the satellite image DB 52 may be divided into a plurality of regions.

Subsequently, in step S520, the searcher 124 may search for a first region corresponding to a current location of a driving vehicle calculated based on vehicle driving information about the driving vehicle from among the plurality of regions. In FIG. 4, the first region may include regions ($P_{55}$, $P_{56}$, $P_{57}$, $P_{65}$, $P_{66}$, $P_{67}$, $P_{75}$, $P_{76}$, $P_{77}$) included in a search range referred to by a reference numeral "402b".

Subsequently, in step S530, the searcher 124 may search for a second region corresponding to a current location of the driving vehicle calculated based on the GPS satellite signal from among the plurality of regions. In FIG. 4, the second region may be a region ($P_{37}$) referred to by a reference numeral "401a", a region ($P_{46}$) referred to by a reference numeral "401b", or a region included in a box referred to by a reference numeral "402b".

Subsequently, in step S540, the searcher 124 may calculate a satellite location measurement error value $P_{satellite.error}$ of the second region. The satellite location measurement error value $P_{satellite.error}$ may be calculated from a satellite location measurement error function f( ) which uses an environment parameter as an input as described above. The environment parameter may include a satellite location measurement error $V_{location}$ statistically calculated in the second region, a satellite location measurement error $V_{weather}$ statistically calculated based on weather of the second region, and a satellite location measurement error $V_{time}$ statistically calculated based on a location measurement time of the second region.

Subsequently, in step S550, the searcher 124 may compare the satellite location measurement error value $P_{satellite.error}$ with a predetermined error limit value $P_{satellite.limit}$. When the satellite location measurement error value $P_{satellite.error}$ is equal to or less than the error limit value $P_{satellite.limit}$, step S560 may be performed, and otherwise, step S580 may be performed.

Subsequently, when it is determined that the satellite location measurement error value $P_{satellite.error}$ is equal to or less than the error limit value $P_{satellite.limit}$ as a result of the comparison which is performed in step S550, the first region and the second region may be set to candidate regions in step S560.

Subsequently, in step S570, satellite images respectively corresponding to the first and second regions may be selected as candidate satellite images.

When it is determined that the satellite location measurement error value $P_{satellite.error}$ is greater than the error limit value $P_{satellite.limit}$, the first region may be set to a candidate region in step S580. That is, the searcher 124 may determine a satellite location measurement result as an unreliable region at the specific weather and specific time of the second region and may exclude the second region from the candidate regions.

Subsequently, in step S590, the searcher 124 may determine a satellite image, corresponding to the first region set to a candidate region, as a candidate satellite image.

When the first region is adjacent to the second region, the searcher 124 may set the second region to a candidate region regardless of a result of comparison performed on the error limit value $P_{satellite.limit}$ and the satellite location measurement error value $P_{satellite.error}$ of the second region. That is, even in a case where the satellite location measurement error value $P_{satellite.error}$ of the second region is greater than the error limit value $P_{satellite.limit}$, when the first region is adjacent to the second region, the searcher 124 may set the first and second regions to candidate regions. For example, as illustrated in FIG. 4, when the first region defined as a search range is 402b and the second region is a region (401b) adjacent to 402b, the searcher 124 may add the second region to a candidate region. In this case, in order to more increase the reliability of the search range for determining the candidate region, the searcher 124 may extend or move the search range so that the search range includes regions ($P_{45}$ and $P_{47}$) adjacent the first region (402b: P55, P56, P57, P65, P66, P67, P75, P76, P77) and the second region (401b: P46). The searcher 124 may determine satellite images, respectively corresponding to regions included in the extended or moved search range, as candidate satellite images. The determined candidate satellite images may be stored in the candidate satellite DB 126_1.

Image Comparator 130

The image comparator 130 may compare an omnidirectional image, input from the image matching unit, with candidate satellite images input from the candidate satellite image selector 120 to determine a candidate satellite image having a highest similarity to the omnidirectional image from among the candidate satellite images.

Figure 7:
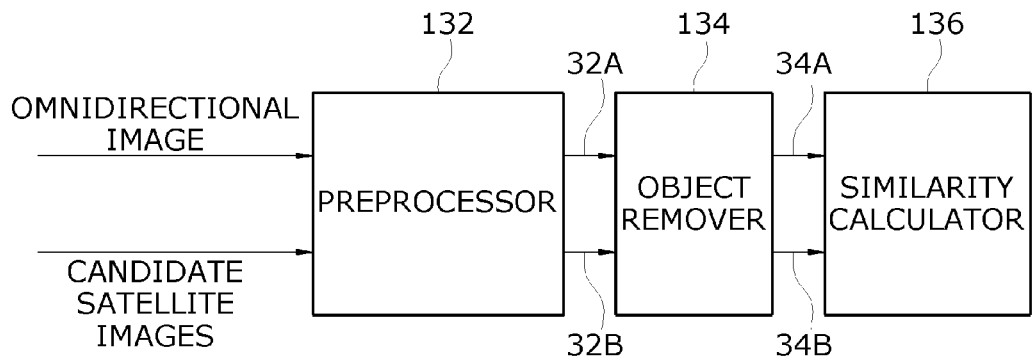
FIG. 7 is a block diagram illustrating an internal configuration of an image comparator according to an embodiment of the present invention.

To this end, as illustrated in FIG. 7, the image comparator 130 may include a preprocessor 132, an object remover 134, and a similarity calculator 136.

The preprocessor 132 may synchronize image attributes of the omnidirectional image and the candidate satellite images. The omnidirectional camera 10 for providing the omnidirectional image and a satellite installation camera for providing candidate satellite images may have different optical characteristics, and thus, the omnidirectional image and the candidate satellite images may have different image attributes. Therefore, the image attribute of the omnidirectional image and the image attributes of the candidate satellite images may need to synchronize therebetween, for accurate comparison between the omnidirectional image and the candidate satellite images. Synchronization of image attributes may include synchronization of number of pixels (resolution), size synchronization of a comparison region, and synchronization based on image rotation. Various image processing algorithms may be used to synchronize image attributes, and their detailed descriptions are the same as technology known to those skilled in the art.

The object remover 134 may remove a movement object included in a preprocessed omnidirectional image 32A and a movement object included in each of candidate satellite images 32B. The movement object included in the preprocessed omnidirectional image 32A and the movement object included in each of the candidate satellite images 32B may be noise factors which obstructs accurate similarity calculation between two images. Accordingly, the movement objects included in the two images may need to be removed. An image recognition algorithm including a background removal algorithm, an object extraction algorithm, and an object recognition algorithm may be used to remove the movement objects.

The similarity calculator 136 may calculate a similarity between a movement-object-removed omnidirectional image 34A and movement-object-removed candidate satellite images 34B.

A similarity calculating method according to an embodiment may calculate a difference value between a histogram distribution chart of the omnidirectional image 34A and a histogram distribution chart of each candidate satellite image. For example, a histogram analysis algorithm may be used to calculate a histogram distribution chart. Based on the difference value between the histogram distribution charts, the similarity calculator 136 may determine a candidate satellite image, which is smallest in difference value between the histogram distribution charts, as a satellite image having a highest similarity to the omnidirectional image.

A similarity calculating method according to another embodiment may calculate a difference value between a feature vector value, corresponding to a road surface indication, a road shape, and a building shape included in an omnidirectional image, and a feature vector value corresponding to a road surface indication, a road shape, and a building shape included in each candidate satellite image. The feature vector value may be calculated by using an object extraction algorithm which is used for the object remover to remove the movement object included in each image. Accordingly, a feature vector value of each image may be provided from the object remover 134.

A similarity calculating method according to another embodiment may use all of a difference value between histogram distribution charts and a difference between feature vector values. When a similarity between two images has no significant difference, for example, when all of difference values calculated by comparing a histogram distribution chart of an omnidirectional image with histogram distribution charts of candidate satellite images are included in an allowable error range which is predetermined for determining a similarity, difference values calculated by comparing a feature vector value of the omnidirectional image with feature vector values of the candidate satellite images may be used to determine a candidate satellite image which is most similar to the omnidirectional image.

On the other hand, when all of difference values calculated by comparing a feature vector value of an omnidirectional image with feature vector values of candidate satellite images are included in an allowable error range which is predetermined for determining a similarity, difference values calculated by comparing a histogram distribution chart of the omnidirectional image with histogram distribution charts of the candidate satellite images may be used to determine a candidate satellite image which is most similar to the omnidirectional image.

Figure 8:
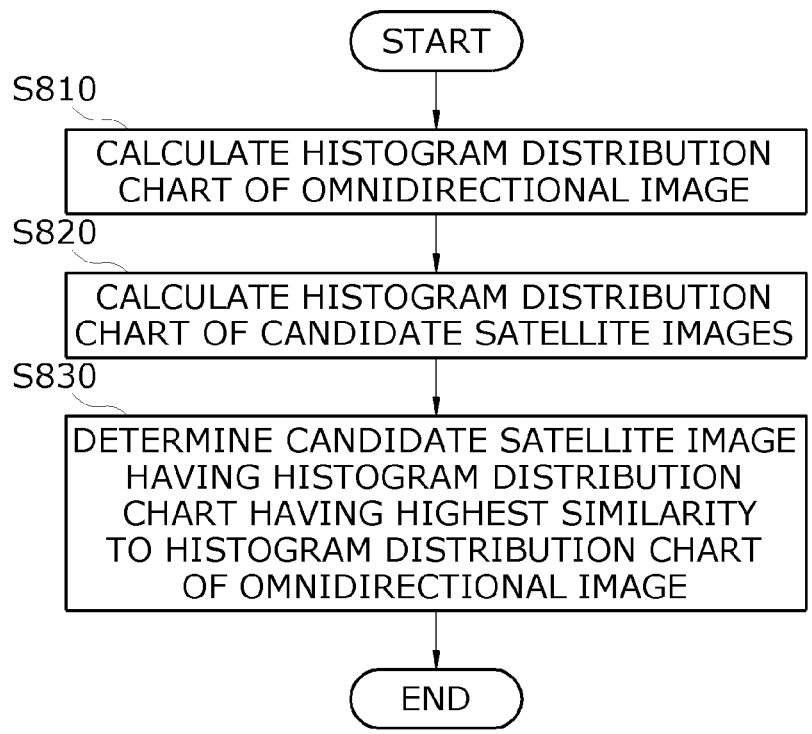
FIG. 8 is a flowchart illustrating a method of determining a candidate satellite image having a highest similarity to an omnidirectional image according to an embodiment of the present invention.

FIG. 8 is a flowchart illustrating a method of determining a candidate satellite image having a highest similarity to an omnidirectional image according to an embodiment of the present invention.

Referring to FIG. 8, in step S810, a histogram distribution chart of the omnidirectional image may be calculated.

Subsequently, in step S820, histogram distribution charts of candidate satellite images may be calculated.

Subsequently, in step S830, a candidate satellite image having a histogram distribution chart which is smallest in difference value with the histogram distribution chart of the omnidirectional image may be determined as a satellite image having a highest similarity to the omnidirectional image.

Figure 9:
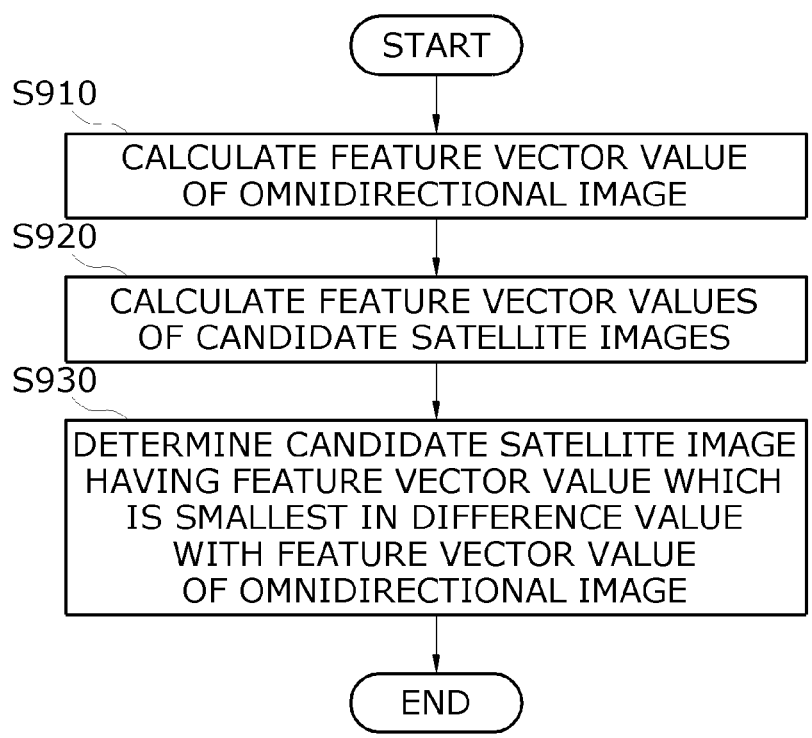
FIG. 9 is a flowchart illustrating a method of determining a candidate satellite image having a highest similarity to an omnidirectional image according to another embodiment of the present invention.

FIG. 9 is a flowchart illustrating a method of determining a candidate satellite image having a highest similarity to an omnidirectional image according to another embodiment of the present invention.

Referring to FIG. 9, in step S910, a feature vector value of the omnidirectional image may be calculated.

Subsequently, in step S920, feature vector values of candidate satellite images may be calculated.

Subsequently, in step S930, a candidate satellite image having a feature vector value which is smallest in difference with the feature vector value of the omnidirectional image may be determined as a satellite image having a highest similarity to the omnidirectional image.

Location Determiner 140

Referring again to FIG. 1, the location determiner 140 may extract a location measurement value, mapped to a satellite image determined as having a highest similarity to an omnidirectional image by the image comparator 130, from the satellite image DB and may finally determine (or estimate) a current location of a driving vehicle on the basis of the location measurement value.

As described above, a vehicle-peripheral image obtained from the omnidirectional camera 10 including a plurality of cameras equipped in a vehicle may be compared with a satellite image captured by a satellite image to calculate a similarity therebetween, and the calculated similarity may be used to determine a self-location of the vehicle, thereby decreasing the manufacturing cost compared to a conventional self-driving vehicle which determines a self-location thereof by using a high-cost multichannel laser scanner and HD map data, solving inconvenience which occurs because HD road map data stored in a server is periodically updated through communication, and reducing the communication cost based thereon.

Figure 10:
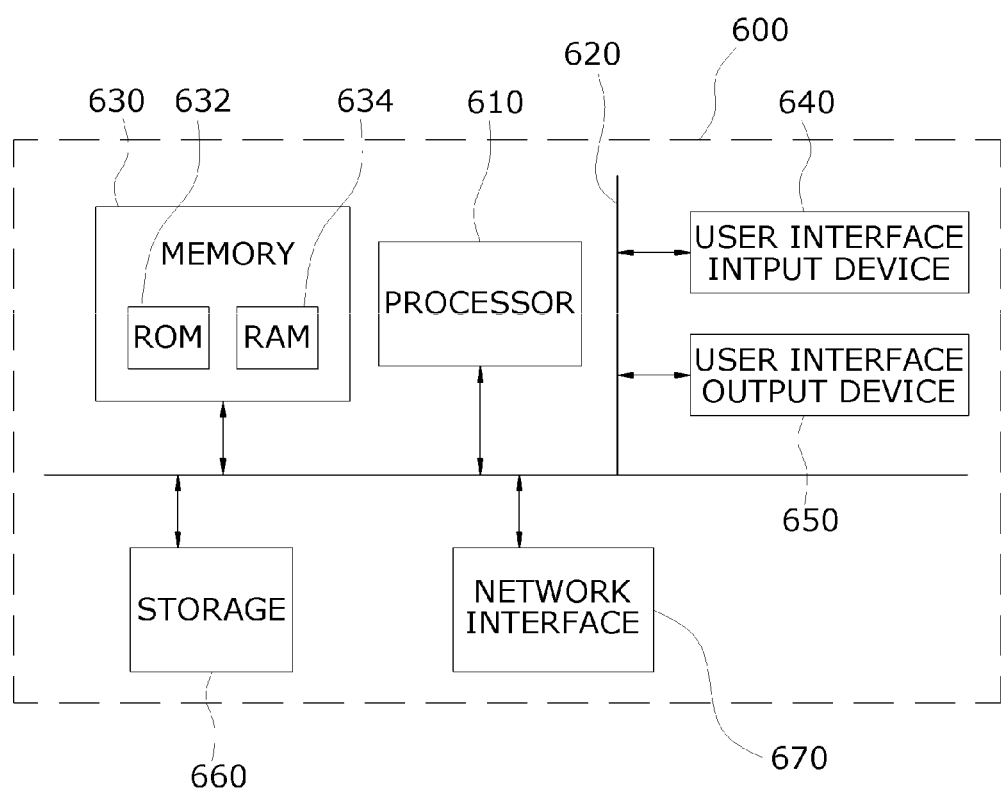
FIG. 10 is a block diagram illustrating a computing system to which a method of estimating a self-location of a vehicle according to an embodiment of the present invention is applied.

FIG. 10 is a block diagram illustrating a computing system 600 to which a method of estimating a self-location of a vehicle according to an embodiment of the present invention is applied.

Referring to FIG. 10, the computing system 600 may include at least one processor 610, a memory 630, a user interface input device 640, a user interface output device 650, a storage 660, and a network interface 670, which are connected to one another through a bus 620.

The processor 610 may be a CPU, a GPU, or a combination thereof. The processor 610 may be a semiconductor device for executing instructions stored in the memory 630 and/or the storage 660. The elements 110, 120, 130, and 140 illustrated in FIG. 1 may be implemented as a logic type and may be embedded into a CPU or a GPU.

Each of the memory 630 and the storage 660 may include various kinds of volatile or non-volatile storage mediums. For example, the memory 1300 may include read only memory (ROM) and random access memory (RAM).

The memory 630 and the storage 660 may store algorithms needed for an image matching process performed by the image matching unit 110, algorithms needed for a process of determining a candidate satellite image by using the candidate satellite image selector 120, and algorithms needed for image comparison and similarity calculation performed by the image comparator 130.

Therefore, a method or a step of an algorithm described above in association with embodiments disclosed in the present specification may be directly implemented with hardware, a software module, or a combination thereof, which is executed by the processor 610.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., the memory 630 and/or the storage 660) such as CD-ROM.

An exemplary storage medium may be coupled to the processor 610, and the processor 610 may read out information from the storage medium and may write information in the storage medium. In other embodiments, the storage medium may be provided as one body with the processor 610. In other embodiments, the processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences. In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

As described above, according to the embodiments of the present invention, an omnidirectional image generated from a plurality of peripheral images generated by the omnidirectional camera installed in a vehicle may be compared with a satellite image obtained from a satellite image DB connected to a navigation system, and a similarity based on a result of the comparison may be used to estimate a self-location of the vehicle, thereby decreasing the manufacturing cost of a self-driving vehicle caused by installation of high-cost sensor devices, solving inconvenience caused by the periodical updating of HD map data, and reducing the communication cost based thereon.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of estimating a self-location of a vehicle, the method comprising:

obtaining an omnidirectional image by using an omnidirectional camera photographing a ground around a driving vehicle at a current location of the driving vehicle;

estimating the current location of the driving vehicle on the basis of a global positioning system (GPS) satellite signal received from a satellite;

searching a satellite image database storing a satellite image obtained by photographing the ground with the satellite to determine candidate satellite images corresponding to the estimated current location of the driving vehicle;

comparing the omnidirectional image with each of the determined candidate satellite images to determine a candidate satellite image having a highest similarity to the omnidirectional image from among the determined candidate satellite images; and finally estimating the current location of the driving vehicle by using a location measurement value mapped to the determined candidate satellite image, wherein the searching a satellite image database comprises converting viewpoints of a plurality of peripheral images based on an installation angle of the omnidirectional camera so that viewpoints of the plurality of peripheral images match a viewpoint at which a camera installed in the satellite faces the ground.

2. The method of claim 1, wherein the obtaining of the omnidirectional image comprises:

obtaining the plurality of peripheral images respectively corresponding to grounds of a forward region, a rearward region, a left region, and a right region of the driving vehicle from the omnidirectional camera;

correcting distortion of the plurality of peripheral images caused by a characteristic of a lens included in the omnidirectional camera;

converting viewpoints of a plurality of distortion-corrected peripheral images;

removing an overlap region between a plurality of viewpoint-converted peripheral images to reconfigure the plurality of viewpoint-converted peripheral images as a single image; and obtaining a reconfigured single image as the omnidirectional image.

3. The method of claim 2, wherein the converting of the viewpoints comprises converting the viewpoints of the plurality of distortion-corrected peripheral images so that a viewpoint facing the ground at the installation angle of the omnidirectional camera installed in the driving vehicle matches the viewpoint at which the camera installed in the satellite faces the ground.

4. The method of claim 1, wherein the determining of the candidate satellite images comprises:

dividing the satellite image into a plurality of regions;

searching for a first region corresponding to the current location of the driving vehicle estimated based on vehicle driving information about the driving vehicle from among the plurality of regions;

searching for a second region corresponding to the current location of the driving vehicle estimated based on the GPS satellite signal from among the plurality of regions;

calculating a satellite location measurement error value of the second region;

comparing the satellite location measurement error value with a predetermined error limit value; and when the satellite location measurement error value is equal to or less than the predetermined error limit value, setting the first and second regions to candidate regions; and determining satellite images, respectively corresponding to the first and second regions set to the candidate regions, as the candidate satellite images.

5. The method of claim 4, wherein the satellite location measurement error value is calculated from a satellite location measurement error function using an environment parameter as an input value.

6. The method of claim 5, wherein the environment parameter comprises a first satellite location measurement error statistically calculated from the second region, a second satellite location measurement error statistically calculated based on weather of the second region, and a third satellite location measurement error statistically calculated based on a location measurement time of the second region.

7. The method of claim 4, further comprising:

when the satellite location measurement error value is greater than the predetermined error limit value as a comparison result obtained by comparing the satellite location measurement error value with the predetermined error limit value, removing the second region from the candidate regions to set the first region to a candidate region; and determining satellite images, corresponding to the first region set to the candidate region, as the candidate satellite images.

8. The method of claim 1, wherein the determining of the candidate satellite image having the highest similarity comprises:

calculating a histogram distribution chart of the omnidirectional image;

calculating a histogram distribution chart of each of the determined candidate satellite images; and determining a candidate satellite image, having a histogram distribution chart which is smallest in difference value with the histogram distribution chart of the omnidirectional image, as the candidate satellite image having the highest similarity to the omnidirectional image.

9. The method of claim 1, wherein the determining of the candidate satellite image having the highest similarity comprises:

calculating a feature vector value of the omnidirectional image;

calculating a feature vector value of each of the determined candidate satellite images; and determining a candidate satellite image, having a feature vector value which is smallest in difference with the feature vector value of the omnidirectional image, as the candidate satellite image having the highest similarity to the omnidirectional image.

10. An apparatus for estimating a self-location of a vehicle, the apparatus comprising:
 an image matching unit configured to match a plurality of peripheral images obtained from an omnidirectional camera installed in a driving vehicle to generate an omnidirectional image;
 a candidate satellite image selector configured to search a satellite image database to determine candidate satellite images corresponding to a current location of the driving vehicle estimated based on a global positioning system (GPS) satellite signal received from a satellite, the satellite image database storing a satellite image obtained by photographing a ground with the satellite;
 an image comparator configured to compare the omnidirectional image with each of the determined candidate satellite images to determine a candidate satellite image having a highest similarity to the omnidirectional image; and
 a location determiner configured to estimate the current location of the driving vehicle by using a location measurement value mapped to the determined candidate satellite image,
 wherein the image matching unit converts viewpoints of a plurality of peripheral images based on an installation angle of the omnidirectional camera so that viewpoints of the plurality of peripheral images match a viewpoint at which a camera installed in a satellite faces the ground.

11. The apparatus of claim 10, wherein the candidate satellite image selector selects, as the candidate satellite images, a first region found based on a current location of the driving vehicle estimated based on vehicle driving information about the driving vehicle and a second region found based on the current location of the driving vehicle estimated based on the GPS satellite signal from among a plurality of divided regions of the satellite image.

12. The apparatus of claim 11, wherein the candidate satellite image selector comprises:
 a location estimator configured to estimate the current location of the driving vehicle on the basis of the vehicle driving information input from a vehicle control unit; and
 a searcher configured to search for the first and second regions by using, as a keyword, the current location of the driving vehicle estimated based on the vehicle driving information input from the location estimator and the current location of the driving vehicle estimated based on the GPS satellite signal input from a navigation system.

13. The apparatus of claim 12, wherein the searcher calculates a satellite location measurement error value of the second region and compares the satellite location measurement error value with a predetermined error limit value and, when the satellite location measurement error value is greater than the predetermined error limit value excludes the second region from the candidate regions.

14. The apparatus of claim 10, wherein the image comparator compares a histogram distribution chart of the omnidirectional image with a histogram distribution chart of each of the candidate satellite images to determine the candidate satellite image having the highest similarity to the omnidirectional image.

15. The apparatus of claim 10, wherein the image comparator compares a feature vector value of the omnidirectional image with a feature vector value of each of the candidate satellite images to determine the candidate satellite image having the highest similarity to the omnidirectional image.

16. The apparatus of claim 10, wherein the omnidirectional camera is an around view camera.

17. The apparatus of claim 10, wherein the driving vehicle is a self-driving vehicle.

* * * * *